(12) United States Patent
White et al.

(10) Patent No.: US 9,877,575 B2
(45) Date of Patent: Jan. 30, 2018

(54) ADJUSTABLE CONDUCTIVE BRUSH ASSEMBLY FOR CLEANING METALS

(71) Applicant: Ensitech IP PTY LTD, Springwood (AU)

(72) Inventors: Clive Stuart White, Faulconbridge (AU); Mark Robert Fischer, Cabramatta (AU)

(73) Assignee: Ensitech IP Pty Ltd. (AU)

( * ) Notice: Subject to any disclaimer, the term of this patent is extended or adjusted under 35 U.S.C. 154(b) by 194 days.

(21) Appl. No.: 14/405,925

(22) PCT Filed: Jun. 7, 2013

(86) PCT No.: PCT/AU2013/000612
§ 371 (c)(1),
(2) Date: Dec. 5, 2014

(87) PCT Pub. No.: WO2013/181715
PCT Pub. Date: Dec. 12, 2013

(65) Prior Publication Data
US 2015/0150368 A1 Jun. 4, 2015

(30) Foreign Application Priority Data
Jun. 8, 2012 (AU) .................................. 2012902410

(51) Int. Cl.
*A46B 17/04* (2006.01)
*A46B 15/00* (2006.01)
(Continued)

(52) U.S. Cl.
CPC ................ *A46B 17/04* (2013.01); *A46B 9/02* (2013.01); *A46B 11/0006* (2013.01);
(Continued)

(58) Field of Classification Search
CPC ....... A46B 17/04; A46B 9/02; A46B 15/0022; A46B 15/0053; A46B 7/023; A46B 2200/3093; B08B 1/002
See application file for complete search history.

(56) References Cited

U.S. PATENT DOCUMENTS 2,661,490 A * 12/1953 Benyak .................. A46B 11/08
15/143.1
4,358,699 A * 11/1982 Wilsdorf ................ H01R 39/24
310/251
(Continued)

FOREIGN PATENT DOCUMENTS

DE 3116327 11/1982
GB 610896 10/1948
(Continued)

*Primary Examiner* — Michael Kornakov
*Assistant Examiner* — Natasha Campbell
(74) *Attorney, Agent, or Firm* — Skinner and Associates; Joel Skinner (57) ABSTRACT

The present invention relates to a brush assembly for cleaning metal, the assembly comprising one or more brush heads, each brush head comprising a bundle of conductive filaments, having a working end adapted for contacting metal, and a terminal end, the brush head connectable to an electricity supply, and a housing connected to and retaining at least one sheath, each sheath at least partially surrounding at least one brush head, wherein each brush head and its respective sheath are movable in relation to each other by operating an adjustment mechanism and the working end of the brush head and the sheath are selectively fixable in relation to each other.

11 Claims, 8 Drawing Sheets

(51) Int. Cl.
| | |
|---|---|
| *A46B 9/02* | (2006.01) |
| *B08B 1/00* | (2006.01) |
| *B08B 1/02* | (2006.01) |
| *B23K 37/08* | (2006.01) |
| *B23K 31/02* | (2006.01) |
| *A46B 11/00* | (2006.01) |
| *A46B 11/06* | (2006.01) |

(52) U.S. Cl.
CPC ........ *A46B 11/063* (2013.01); *A46B 15/0022* (2013.01); *A46B 15/0053* (2013.01); *B08B 1/02* (2013.01); *B23K 31/02* (2013.01); *B23K 37/08* (2013.01); *A46B 2200/30* (2013.01)

(56) References Cited

U.S. PATENT DOCUMENTS

2009/0029631 A1\* 1/2009 Offer ...................... B24D 13/10
451/28
2011/0036373 A1\* 2/2011 Hilton ...................... A46B 9/02
134/6

FOREIGN PATENT DOCUMENTS

| WO | WO2005089968 | 9/2005 |
|---|---|---|
| WO | WO2010085849 | 8/2010 |

\* cited by examiner

ADJUSTABLE CONDUCTIVE BRUSH ASSEMBLY FOR CLEANING METALS

TECHNICAL FIELD

The present invention relates generally to a conductive brush assembly used to clean metals. In particular, the invention relates to a conductive brush having one or more brush heads which are selectively fixable at a desired length using manual or automatic adjustment means.

BACKGROUND TO THE INVENTION

During the process of welding a metal, it is common for the metal to become discoloured by the welding process. For example, when welding stainless steel, the chromium content of the metal is depleted, exposing iron and causing a localised discolouration of the stainless steel, known as "heat tint". In other applications, oxides form during the welding process, leaving unattractive deposits on the surface of the metal, or otherwise discolouring the metal.

It is common practice that after a metal has been welded, the discoloured surfaces are cleaned to remove or reduce the heat tint. In the past, this has typically been performed by a variety of methods, such as using an abrasive, bead blasting or exposing the discoloured region to strong acids. Electropolishing machines that apply an electrolyte in combination with a pad to portions of metal have also been used for mile discolouration. More recently, cleaning of welded joints has been performed using an electrically charged brush having conductive filaments, in conjunction with an electrolyte, to clean a metal surface by applying a concurrent chemical reaction, heat and electric current. The simultaneous electrolytic and high temperature cleaning action has proven successful in efficient cleaning of welded metals, particularly in cleaning stainless steel.

One method used to clean welded metal surfaces is disclosed in International PCT patent publication no. 2005/089968 entitled "Conductive brush for cleaning metals" in the name of co-applicants Fornasari and Bunting. This document describes the use of a brush containing conductive filaments connected to an electrode and a source of cleaning solution. The conductive filaments of the brush are used to apply electrical current and cleaning solution to a discoloured surface of a metal, whilst also brushing the surface, to remove localised discolourations.

Whilst the charged brush disclosed by this prior published patent application would likely prove an effective method of cleaning a metal, the filaments of the brush are constantly degraded during the process, consuming filament material. Accordingly, brush operators must monitor filament length and replace a brush when required. This is inconvenient, time consuming and potentially excessively costly. Having to regularly replace brushes can also prove particularly problematic in relation to automated cleaning, where an operator is not necessarily present to replace a brush, potentially causing machine down-time. Furthermore, the conductive filaments of the disclosed brush are relatively flexible and have a tendency to splay out. This reduces the concentration of the electric current ('current density') and reduces the cleaning speed of the method.

International PCT application no. 2010/085849 entitled "Conductive brush for cleaning metals" in the name of Kezza Products Pty Ltd discloses an alternative conductive brush for cleaning welded stainless steel. The brush in this patent application has a body connected to a fixed length of conductive brush filaments and a sheath arranged around the filaments. The sheath has an aperture through which the filaments extend having a profile of a particular geometry to shape the filaments retained within the sheath. The sheath is also movable with respect to the body and filaments, the movement adjusting the portion of brush filaments that protrude from the aperture, adjusting the effective length and stiffness of the filaments.

The brush disclosed by this patent application offers some advantages over the prior art as the sheath allows the active length of brush filaments to be adjusted, which adjusts the brush stiffness. Also, as the sheath aperture has a particular cross-sectional profile, the filaments are retained within this profile. The adjustment of the sheath therefore enables a user to adjust the properties of the brush according to the cleaning task and in particular, allows a user to shorten the filaments to create a stiff brush having a particular shape for specific cleaning requirements, such as precise application of the bush, and increasing the current density applied by the brush.

Whilst these advantages are beneficial to a conductive brush for cleaning metals, the brush disclosed by this patent also has a number of drawbacks. For example, the position of the sheath with respect to the filaments or body is freely adjustable and is unable to be locked. During use, this requires a user to manually maintain the position of the sheath or else the sheath may move from the desired position, releasing the filaments from the desired, precise brush geometry. Accordingly, it would be advantageous to have a locking mechanism to hold the sheath in place.

Also, the disclosed invention relates to a brush having a single brush head only. This is very restrictive, as the cleaning area is limited to the size of a single brush only. It would be advantageous to have a conductive brush assembly which may have a single or multiple adjustable brush heads to increase the cleaning area or create more complex geometry brushes for particular cleaning tasks.

The disclosed invention is also limited with regard to the length of brush filaments it is able to provide, by the length of the sheath. If the conductive filaments are longer in length than the sheath, the sheath is no longer able to contain the filament geometry or regulate the stiffness of the filaments. Accordingly it would be useful to have an arrangement whereby the brush length could be much greater than the length of the sheath, allowing the replacement interval for brushes to be greatly extended, or avoided altogether.

SUMMARY OF THE INVENTION

According to one aspect of the invention, there is provided a brush assembly for cleaning metal, the assembly comprising one or more brush heads, each brush head comprising a bundle of conductive filaments, having a working end adapted for contacting metal, and a terminal end, the brush head connectable to an electricity supply, and a housing connected to and retaining at least one sheath, each sheath at least partially surrounding at least one brush head, wherein each brush head and its respective sheath are movable in relation to each other by operating an adjustment mechanism and the working end of the brush head and the sheath are selectively fixable in relation to each other.

In one preferred embodiment of the invention, the adjustment mechanism is operated manually, however in another, the adjustment mechanism is operated by automated means.

In a preferred embodiment of the invention, the working end of each brush head is movable and selectively fixable in relation to a respective sheath.

In one aspect of the invention, each bundle of conductive filaments has a fixed length. Furthermore, it is preferable that each sheath has a longitudinal axis and a longitudinal length substantially parallel with the longitudinal axis, and the length of each bundle of conductive filaments is greater than the longitudinal length of the sheath. Alternatively, it is preferable in some instances that each bundle of conductive filaments is connected to a substantially continuous supply of filaments.

According to a different aspect of the invention, the brush assembly has two or more brush heads.

Preferably, the assembly includes supply means to provide a stream of one or more cleaning solutions to each brush head. Furthermore, it is preferred in some applications that a first cleaning solution is provided to a first brush head and a second cleaning solution is provided to a second brush head.

In a further alternative preferred embodiment of the invention, fume extraction means is connected proximal to at least one brush head, the fume extraction means adapted to draw fumes away from said brush head. In this embodiment it is preferable that the fume extraction means includes a cone at least partially surrounding the brush head and in fluid communication with a vacuum source to draw said fumes away. Preferably, the cone has at least a portion that is substantially transparent.

In a different preferred embodiment of the invention, the adjustment mechanism is configured to urge the working end of each brush head away from the sheath. In one preferred embodiment, the adjustment mechanism includes drive means configured to dispense the bundle of conductive filaments away from the sheath at a constant rate. In another, the adjustment mechanism preferably includes drive means configured to dispense the bundle of conductive filaments away from the sheath at a variable rate that is proportional to a rate of filament degradation.

It is preferable that the adjustment mechanism includes a locking mechanism configured to fix the position of the working end of at least one brush head in relation to a respective sheath. The locking mechanism preferably retains the brush head in a desired position using one or more of: frictional engagement, mechanical engagement, or magnetic force.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

The present invention relates generally to a conductive brush for cleaning metals and in particular, relates to a conductive brush having one or more brush heads that are at least partially surrounded by a sheath connected to a housing and the position of each brush head and respective sheath in relation to each other is adjustable and selectively fixable.

The present invention is generally configured to assist in the delivery of electrical current to a surface of a metal being cleaned and may also deliver a cleaning fluid to this surface to assist with cleaning. Reference in general wilt be made throughout this specification to the brush assembly being used in conjunction with the cleaning apparatus disclosed in International PCT patent application no. 2005/089968. However, it will be appreciated that the invention may be used in conjunction with other types of cleaning apparatus where the conductive filaments of a brush assembly are likely to be degraded or consumed over time, or where the length of such a brush needs to be altered to increase or decrease stiffness, or where the geometry of the brush needs to be constrained to maintain current density in a particular cleaning application.

A brush assembly provided by the invention includes at least one brush head formed from a bundle of conductive filaments. The conductive filaments selected for this role may vary depending on the application in which the invention is used and the metal to be cleaned. Reference in general will however be made to the invention employing filaments equivalent those disclosed in the patent specification WO 2005/089968. However, those skilled in the art should appreciate that some variation in the form of filaments used is also within the scope of the invention.

The brush assembly provided by the invention comprises one or more brush heads. For example, in some instances a single brush head may be provided as is disclosed in the patent specification WO 2005/089968. However in other instances, the brush assembly may include two or potentially more separate brush heads. Providing a plurality of bundles in a single brush assembly gives an increased degree of flexibility in the form or shapes of metal surfaces which may be cleaned using the invention and increases the contact area between the brush assembly and a metal, increasing the area which may be cleaned in brush stroke.

In a preferred embodiment the brush assembly includes housing which has one or more integral or separate sheath elements, each sheath associated with a brush head. Each of these sheaths retain the filaments of a brush head together and maintain a preferred brush head cross-sectional profile when the brush is placed in contact with a metal surface.

According to one aspect of the invention, the housing or sheaths include one or more fluid ports. These fluid ports allow for the distribution of cleaning fluid in association with a bundle of filaments, or the extraction of fumes or fluids.

A housing provided in accordance with the invention defines at least one aperture through which a brush head extends and can be placed in contact with a metal surface. Each brush head has a working end that is arranged distally from the aperture and external to the housing, and adapted to contact and clean a metal surface. Where the housing also defines one or more sheaths for individual brush heads, this aperture may be formed in an end of each sheath.

In one preferred embodiment of the invention, the brush assembly includes one or more drive elements arranged to urge one or more brush heads away from a housing, through a respective aperture. A drive element provided with the invention can be used to replenish the working end of a brush head as it is depleted with use.

The brush assembly also includes a locking mechanism to engage with the drive element, brush head, or other component associated with a brush head, to lock it in place. The locking mechanism allows for each brush head to be positioned in a desired arrangement in relation to a sheath or housing and retained in place during use. The locking mechanism may include one or more of frictional engagement, magnetic force or the like, or may utilize other arrangements to suit this purpose.

In one preferred embodiment, the working end of a brush head that extends beyond the end of an aperture is used in conjunction with an electolyte to clean the metal surface. The terminal end of the bundle of fibres is electrically connected to a source of electrical energy, which circuit is completed by a clamp which also connects the source of electrical energy to the metal being cleaned. One feature of the invention is the requirement to electrically connect the terminal end of the fibres to the source of electrical energy regardless of the position of the terminal end with respect to the housing or sheath.

In one embodiment a drive element may operate to apply constant force or to urge a brush head out of the housing at a constant rate. In such instances the drive element may preferably act automatically once a cleaning apparatus using the brush assembly is operated or activated.

In a preferred embodiment, a drive element may operate to match the speed at which a brush head is urged from the housing with the rate at which the working end of the brush head is consumed during a cleaning operation. In such instances the force or speed of operation of the drive element may be controlled by various input parameters supplied from or associated with the cleaning apparatus, such as—for example—the current applied through the brush assembly, or the type of metal which is to be cleaned.

In a preferred embodiment, a drive element may be adapted to apply a force to the terminal end of a bundle of filaments to push the bundle out of the housing as it is consumed with use. In such embodiments the application of force to the terminal end of the bundle ensures that a significant proportion of the filaments making up a bundle will ultimately be consumed prior to the performance of the brush assembly degrading.

In one preferred embodiment a drive element may be formed by an electric motor linked to a plunger assembly engaged with the terminal end of a bundle of filaments. In such embodiments the electric motor may slowly extend this plunger assembly to apply a force to the terminal end of a bundle, and therefore force the bundle out of the housing.

However in one alternative embodiment a drive element may be formed by an electric motor linked to a carriage on which the terminal end of a bundle is mounted. In such embodiments this carriage may be engaged with an interior surface of the housing by way of a thread, with the electric motor being arranged to rotate the carriage and thereby drive the bundle out of the housing along this thread.

In another embodiment, the means for urging the bundle out of the aperture may be manually operated.

Those skilled in the art should appreciate that in some embodiments a single drive element may be provided for an entire brush assembly, or in other cases a drive element may be provided for each and every bundle of filaments making up the brush assembly. Furthermore, the above exemplary forms of drive element may also be adapted to urge out collections bundles or single bundles only from the housing as required by the particular application in which the invention is used.

In a first preferred embodiment, the adjustment mechanism is operated manually. It is envisaged that this embodiment will be used for "hands on" applications where the operator will use the device of the present invention to hand clean a weld. In this arrangement, it is envisaged that each bundle of filaments is of a fixed length. In this way, as the bundle of filaments is used up and ultimately exhausted during use, replacement filaments can be purchased and installed within the device of the present invention.

In a second preferred embodiment, the adjustment mechanism is operated by automated means. It is envisaged that this embodiment will be used in production line applications where the device of the present invention will be used to automatically clean welds in assembly line applications.

In this arrangement, it is envisaged that there is a continuous supply of filament material, which will be used up and exhausted during use. The rate at which the filament material is automatically supplied can be adjusted to suit various applications. Preferably, the rate at which the filament material is supplied directly correlates with the rate at which the filament is used up and exhausted during use.

In a preferred embodiment, the brush comprises a plurality of brush heads, which are movable independently or concurrently. At least one cleaning solution can be supplied to each brush head. This can either be done by simply manually "dipping" the brush head in cleaning fluid solution or in a more automated approach, the cleaning solution can automatically be supplied to the brush head. In one embodiment, a first cleaning solution is supplied to a first brush head and a second cleaning solution is supplied to a second brush head.

In order for a connection to be made from the power supply to the movable brush bundle, a sliding connection is required. One facet of this invention is the configuration of this sliding connection. The contact spring is electrically connected to the terminal end of the drive element, in this case a threaded rod or shaft, by means of a spring pin. The connector is shaped in such a way that it maintains a high-pressure connection with the inside of the hollow handle, in such a way that it maintains electrical connection with the hollow handle while sliding along its length. In this embodiment of the invention, the connector also has flanges that engage in a slot inside the hollow handle that prevent the threaded rod from rotating with the split nut.

A fume extraction mechanism is connected proximal to at least one brush head. The fume extraction mechanism includes a cone at least partially surrounding the brush head, and the cone is in fluid communication with a vacuum source. The cone has at least a portion that is substantially transparent to allow visual inspection of the fume extraction mechanism.

The adjustment mechanism is configured to urge the working end of each brush head away from the sheath. The adjustment mechanism includes a locking mechanism, which is configured to fix the position of the working end of at least one brush head in relation to a respective sheath. This is an important aspect of the present invention as it allows for precise and controlled use of the brush device, thereby allowing for targeted precision weld cleaning. The locking mechanism retains the brush head using one or more of frictional engagement, mechanical engagement or magnetic force.

In some embodiments, at least a portion of the sheath is formed from a flexible material and is configurable to form a plurality of different shapes. In one embodiment, the sheath is associated with a plurality of rods or shafts extending substantially parallel to a longitudinal axis of the sheath. In this embodiment, the flexible portion extends between each rod. The position of each rod with respect to the sheath is adjustable, and each rod is movable using automated means.

Figure 1A:
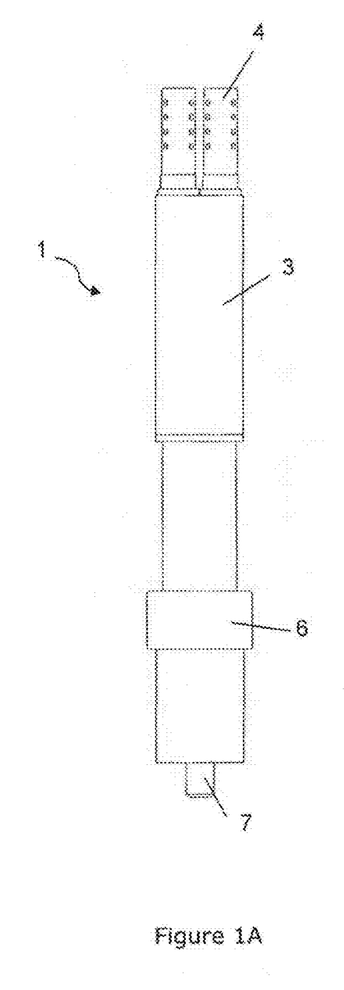
FIGS. 1A-1C are side views of a brush assembly in accordance with a preferred embodiment of the invention.
Figure 1B:
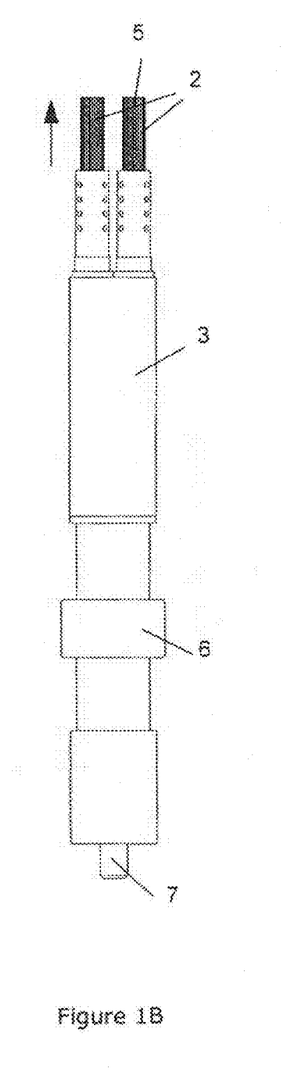
Figure 1C:
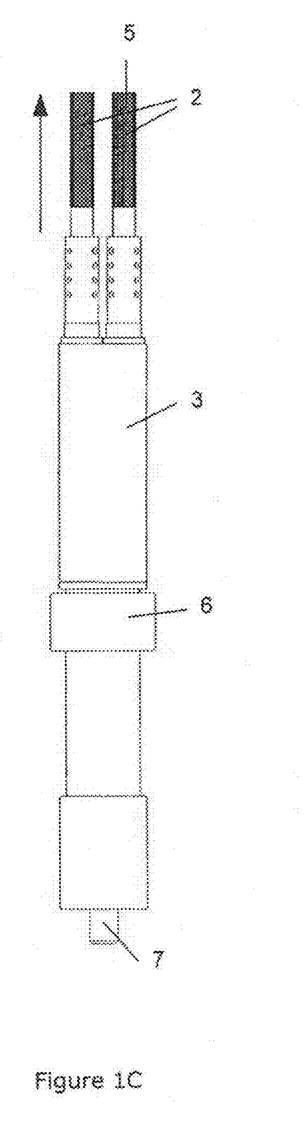

Turning to the drawings, FIGS. 1A-1C show side views of a preferred embodiment of the invention, showing a conductive brush assembly 1 in three different stages of brush head 2 position adjustment. In this embodiment the brush assembly includes a housing 3 and two integrated sheaths 4, each sheath at least partially surrounding a respective brush head 2 and defining a brush aperture through which each brush head extends. Each brush head 2 comprises a bundle of conductive filaments and has a working end 5, that is positioned distally from the sheath and adapted to contact and clean a portion of metal. Each brush head also has a terminal end (not shown), at the opposite end of the filaments to the working end, fixed to an adjustment mechanism 6 within the housing. Each brush head 2 is also connected to an electricity supply within the housing, fed by an electrical cable connected to the housing at an electrical connector 7. Whilst the brush assembly is shown with two brush heads, it will be appreciated that this is merely an example of the various bush head configurations possible with the invention, and that more or less brush heads may be provided according to design requirements, such as the geometry of a metal article to be cleaned, or the geometry or severity of the discolouration of the metal. Similarly, whilst each sheath is shown as an integral part of the housing, it is within the scope of the invention that each sheath is a separate part and connected to the housing, and may be movably or rotatably connected to the housing to allow each brush head to be reorientated.

In FIG. 1A (left), the brush assembly 1 is shown with the adjustment mechanism 6 at a minimum brush length position, where each brush head is withdrawn within the housing 3. This is a storage configuration, where each brush head is protected within the housing.

In FIG. 18 (centre), the brush assembly 1 is shown with the adjustment mechanism 6 positioned partway along its travel and a working end 5 of each brush head 2 extended away from each respective sheath 4 and housing 3 by a proportional distance to the travel of the mechanism 6. The adjustment mechanism is also lockable in this position, maintaining the extension of each brush head during use of the brush assembly when cleaning metals. In this configuration, the length of the conductive filaments that extend away from each respective sheath are relatively short due to the proximity of the working end to the surrounding sheath and accordingly, each brush head is relatively stiff. This ensures that each brush head is relatively restricted and unable to splay apart, maintaining a smaller working end contact area and accordingly, increasing the current density.

In FIG. 1C (right), the brush assembly 1 is shown with the adjustment mechanism positioned at the extent of its travel and at a maximum brush length position, in which the working end 5 of each brush head 2 is located at the maximum distance from each sheath 4 as possible and locked in this position. In this configuration, the length of the conductive filaments that extend away from each respective sheath are at a maximum value and accordingly, each brush head is relatively flexible. This allows each brush to splay apart, increasing the working end contact area and allowing a larger area of metal to be cleaned in each brush stroke, however decreasing the current density.

Whilst FIGS. 1A-1C illustrate the position of a working end 5 of a brush head 2 being adjusted with respect to each sheath 4, it is also within the scope of the invention that each sheath is connected to the adjustment mechanism 6 and the position of each sheath with respect to the working end of each brush head is adjustable, similarly adjusting the effective length of the brush head filaments.

FIGS. 1A-1C illustrate the position of each brush head 2 being adjusted simultaneously. Whilst this is a preferred embodiment, the position of each brush head may be adjusted independently from each other, increasing the adaptability of the brush assembly 1 according to user requirements.

Figure 2:
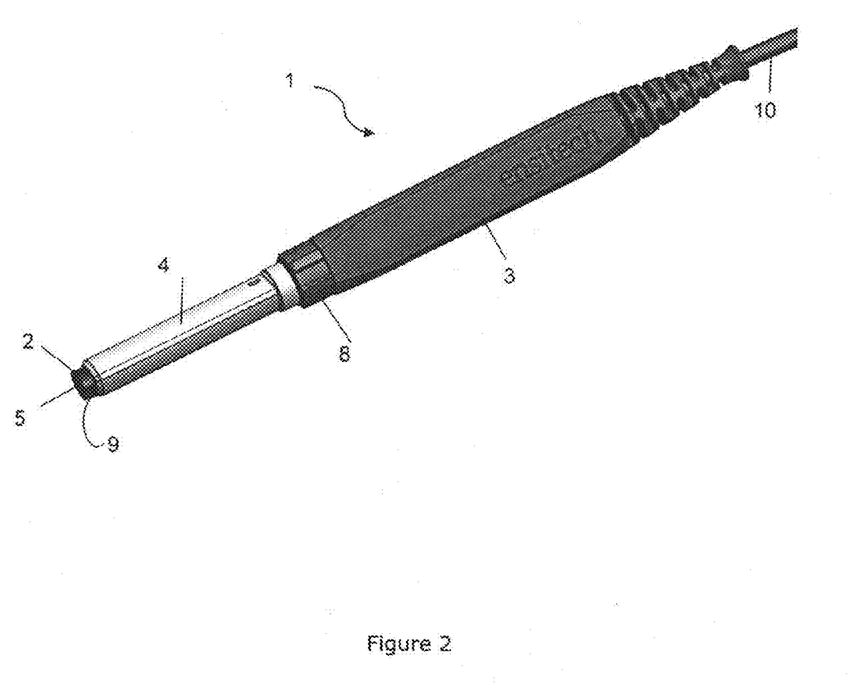
FIG. 2 is a perspective view of a brush assembly in accordance with an alternative preferred embodiment of the invention.

FIG. 2 shows a perspective view of an alternative preferred embodiment of the invention. In this embodiment, the brush assembly 1 includes a housing 3 connected to a separate sheath component 4 and a single brush head 2 connected within the housing. The housing is also connected to an adjuster ferrule 8 such that when the ferrule is rotated by a user, the position of the working end 5 of a brush head 2 is adjusted with respect to the sheath. The sheath has a specifically shaped brush aperture 9 which retains the filaments of the brush head in a desired geometry. The housing is also connected to an electricity supply cable 10 which provides electricity to a terminal end of the brush head within the housing.

Figure 3:
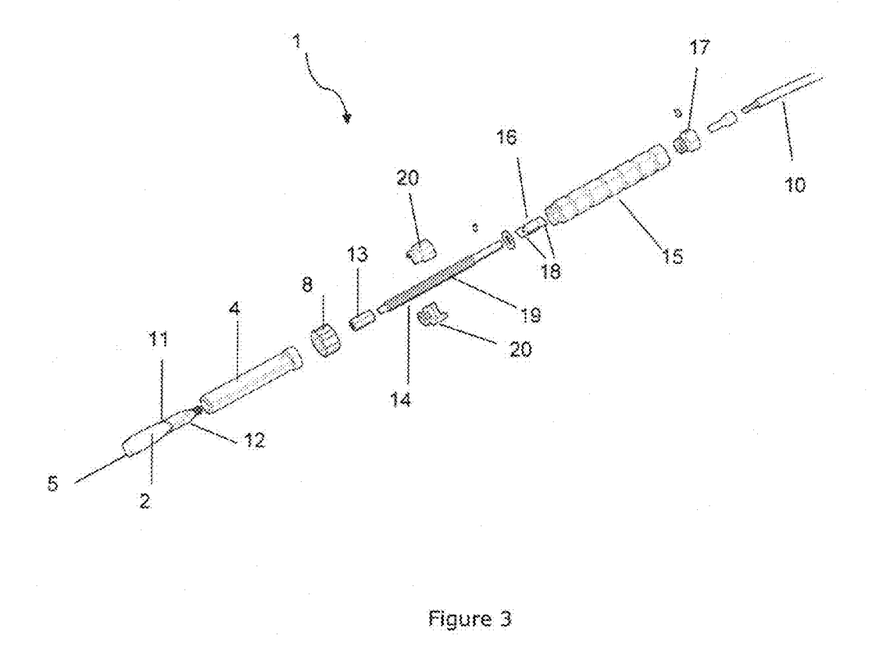
FIG. 3 is an exploded perspective view of the brush assembly shown in the previous Figure.

FIG. 3 is an exploded view of the brush assembly 1 shown in the previous Figure, with the housing hidden, illustrating the internal components of the brush assembly. As previously mentioned, each brush head 2 comprises a bundle of conductive filaments, the bundle having a working end 5 and a terminal end 11, in this case, secured to a brush base 12. The brush base is threadedly engaged with a shaft connector 13, which is in turn connected to, or formed as a part of, a first end of a shaft or rod 14. The shaft is adapted to fit within a conduit through a wand 15, and a second end of the shaft is connectable to a contact spring 16. The wand is also connected to a cable connector 17 which secures an electrical cable 10 to the wand and provides an electrical coupling between the cable and the wand. The conduit that passes through the body of the wand has at least two channels running along at least a portion of its length, adapted to retain a flange 18 protruding from either side of the contact spring 16 such that the contact spring is slidably engaged with the wand, within the channels. As the body of the wand is formed form an electrically conductive material, the contact spring provides an electrical coupling between the wand and the shaft, which in turn provides a coupling to the brush head and filaments. This is a particularly advantageous arrangement as an electrical connection is maintained between the electricity supply, i.e. the cable 10, and the brush head 4, regardless of the position of the shaft with respect to the wand. It should be noted that the housing (not shown) is formed from a non-conductive material and encloses the wand completely, eliminating the risk of a user handling the brush assembly from coming into contact with the wand or shaft and being electrocuted.

The shaft 14 has a conventional helical thread 19 arranged in a peripheral region and along at least a portion of its length, adapted to mate with two split nut components 20. Each split nut has a complimentary thread to the shaft and is retained within the ferrule 8, which is rotatably connected to the housing and able to be freely rotated with respect to the housing. In this embodiment, each split nut is also connected to the sheath 4, preventing axial movement of each split nut within the ferrule/housing.

The relationship between the ferrule 8, the split nuts 20 and the shaft 14 provides the adjustment mechanism for this embodiment of the invention, allowing the position of the brush head 4 to be adjusted. As the ferrule is rotated by a user, each split nut acts on the thread 19 of the shaft. As the shaft is connected to the wand 15 by the contact spring flanges 18, the rotation of the shaft causes each flange to collide with the walls of its respective channel and prevents the shaft from rotating with respect to the wand. The resultant effect of rotating the ferrule is that as the shaft can not rotate, it is displaced axially with respect to the wand. This in turn axially displaced the brush head 2 connected to the shaft and adjusts the effective length of the brush head with respect to the sheath 4. As the position of the shaft is adjusted using a conventional screw thread arrangement, the axial position of the shaft with respect to the wand is inherently 'locked', preventing the brush head from being forced into the sheath during use and firmly maintaining the brush head position with respect to the sheath. Accordingly, the position of the brush head is readily and accurately adjustable by a user, and selectively fixable with respect to a sheath surrounding the brush head.

Figure 4:
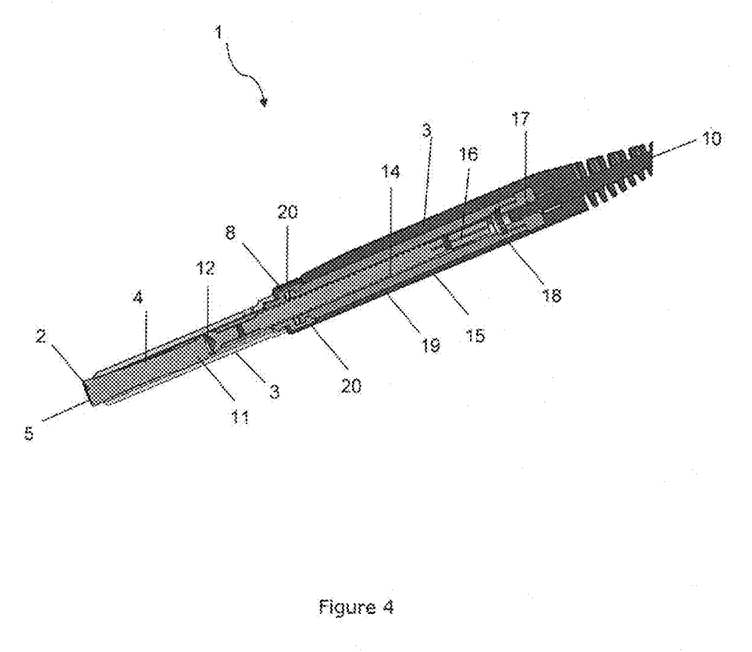
FIG. 4 is a perspective cross section view of the brush assembly shown in the previous two Figures.

FIG. 4 is a perspective cross-section view of the brush assembly shown in the previous two Figures. This Figure further illustrates the relationships between the internal components of the invention described with respect to the previous Figure. In this Figure, the connections between the sheath 4, split nuts 20, ferrule 8, wand 15 and housing 1 are more clearly shown. Also, the threaded engagement between each split nut and the shaft thread 19 can be seen. At the other end of the shaft, the contact spring 16 and the associated tabs or flanges 18 are also visible, which are slidably engaged with a respective channel arranged in a side wall of a conduit through a wand 15. The wand is also shown sealed within the non-conductive housing 3 such that a user can not make contact with any electrically active components.

Figure 5A:
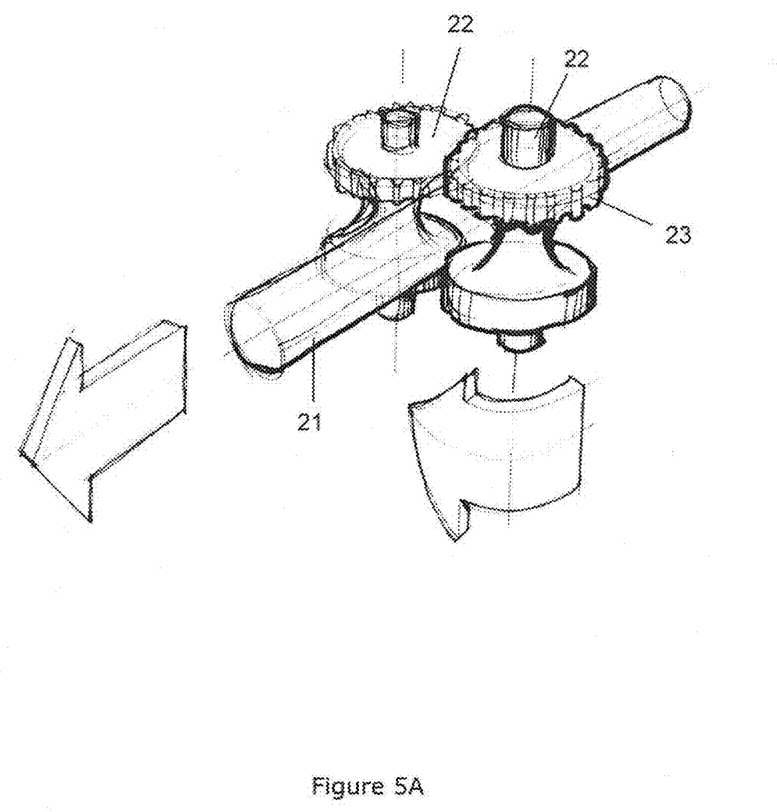
FIGS. 5A-5B are perspective and cross section detailed views of an alternative adjustment mechanism in accordance with a further preferred embodiment of the invention.

FIG. 5A illustrates an alternative aspect of the invention, showing an alternative shaft or brush head axial displacement mechanism. In this embodiment, a cylindrical shaft 21 which is connected to a brush head having a fixed length of conductive filaments, such has been described in relation to the previous Figures, or a continuous bundle of filaments 21, such as supplied from a drum of wound filament material, is passed between two rollers 22. The rollers are rotatably connected within a housing of the brush assembly such that the space between each roller body is configured to frictionally engage with the shaft/continuous filament supply 21, 'pinching' the shaft/filaments and preventing the shaft/filaments from freely moving between each roller. Each roller is also mechanically engaged with the other, with a plurality of gear teeth 23 as shown, or other conventional methods, such that rotation of one roller will rotate the other.

Figure 5B:
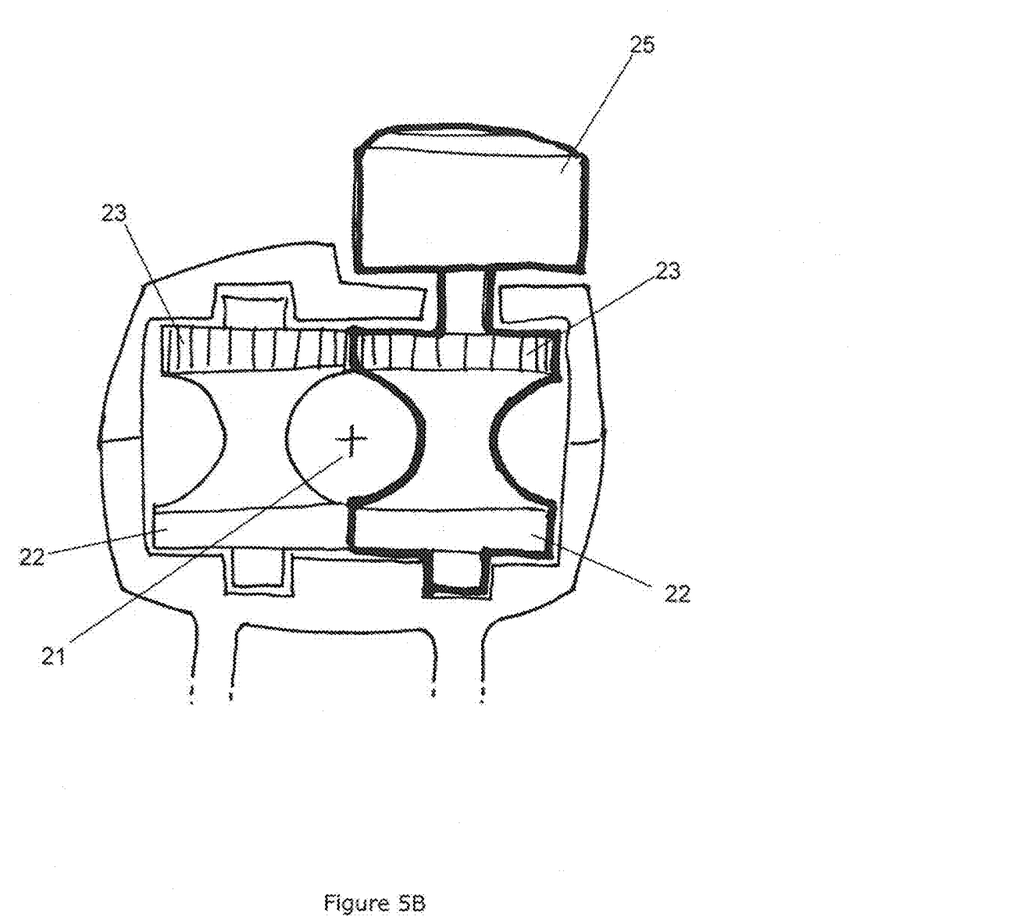

FIG. 5B further illustrates the mechanism shown in the previous Figure, showing the rollers 22 rotatably connected within a brush assembly housing 3. At least one of the rollers is also connected to an actuator 25, in this case being a nob connected along an axis of a roller. When the actuator is rotated, the adjustment mechanism is activated, rotating one roller, which, as it is engaged with the other by the teeth 23, rotates the other roller simultaneously and forces the shaft/filament trapped between the rollers in the direction of rotation. The result is that rotation of an actuator allows a shaft/filament supply to be axially displaced in either direction. Furthermore, a locking mechanism may be added to at least one roller, such as a conventional ratchet mechanism, or other mechanical or automated rotation controller, to prevent undesired rotation of the rollers and effectively 'lock' the mechanism.

Figure 6A:
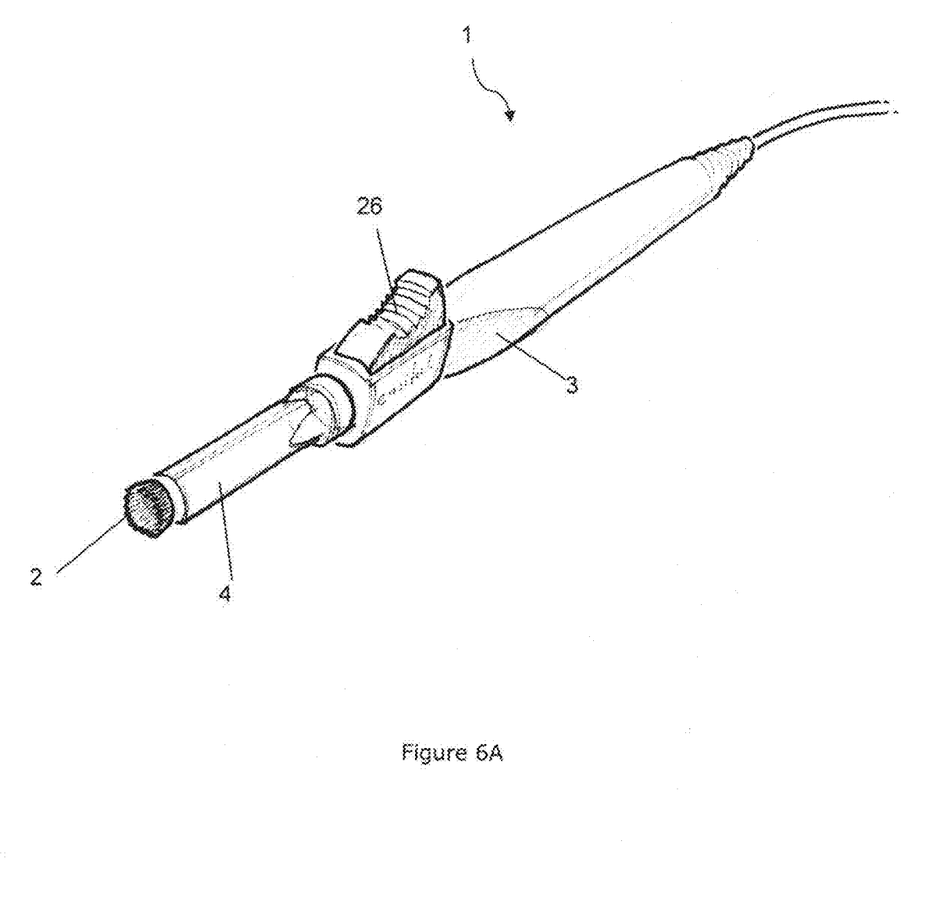
FIGS. 6A-6B are perspective and cross section views of a further alternative preferred embodiment of the invention.
Figure 6B:
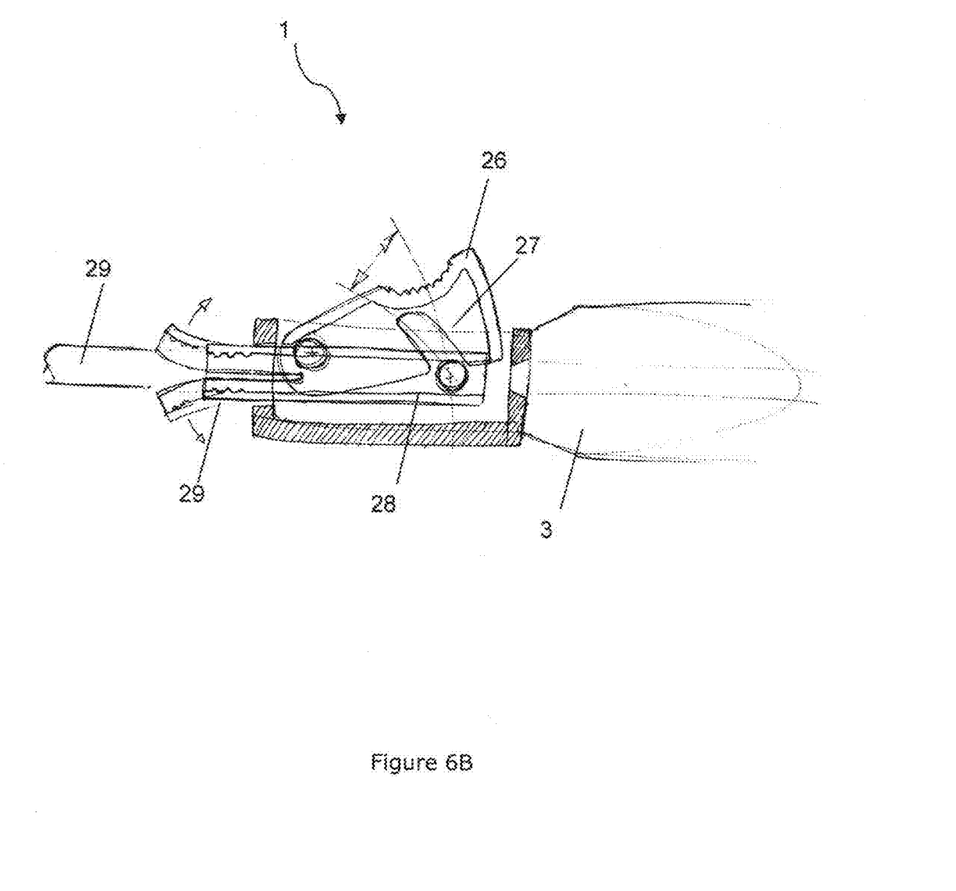

FIGS. 6A-6B illustrate a further alternative preferred embodiment of the invention, in which the position of a brush head 2 with respect to a sheath 4 and/or housing 3 is adjustable by automated means. In this embodiment, the automated adjustment mechanism comprises a conventional 'mechanical pencil' arrangement. An actuator lever 26 is rotatably connected to a housing 3 and has a side wall with a curved slot 27. The slot is adapted to engage with a collet 28, which surround and frictionally engages a shaft 29 connected to the brush head 2. When the lever is pressed by a user, the slot comes into contact with the collet and forces the assembly towards the brush head, propelling the shaft through the housing and extending the brush head out of the sheath. An additional collet or restriction may also be included which prevents the shaft from receding into the housing when the lever is released. Whilst this mechanism is discussed with reference to a brush head affixed to a shaft, it will also be appreciated that it the mechanism is applicable to a continuous supply of brush filaments.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

It will be apparent that obvious variations or modifications may be made which are in accordance with the spirit of the invention and which are intended to be part of the invention, and any such obvious variations or modifications are therefore within the scope of the invention. Although the invention is described above with reference to specific embodiments, it will be appreciated that it is not limited to those embodiments and may be embodied in other forms.

The invention claimed is:

1. A brush assembly for cleaning metal comprising:
   one or more brush heads, each brush head comprising a bundle of conductive filaments, having a working end adapted for contacting metal, and a terminal end;
   said brush head connectable to an electricity supply; and
   a housing connected to and retaining at least one sheath, each sheath at least partially surrounding at least one brush head and wherein at least a portion of each sheath is formed from a flexible material and is configurable to form a plurality of different shapes;
   wherein each brush head and its respective sheath are movable in relation to each other by operating an adjustment mechanism;
   the working end of said brush head and said sheath being selectively fixable in relation to each other;
   wherein the adjustment mechanism includes a locking mechanism configured to fix the position of the working end of at least one brush head in relation to a respective sheath;
   wherein the locking mechanism retains the brush head using one or more of: frictional engagement, mechanical engagement, or magnetic force; and
   wherein the sheath is associated with a plurality of rods extending substantially parallel to a longitudinal axis of the sheath, the flexible portion extending between each rod.

2. The brush assembly of claim 1 wherein the adjustment mechanism is operated manually.

3. The brush assembly of claim 2 wherein each bundle of conductive filaments has a fixed length.

4. The brush assembly of claim 3 wherein each sheath has a longitudinal axis and a longitudinal length substantially parallel with the longitudinal axis, wherein the length of each bundle of conductive filaments is greater than the longitudinal length of the sheath.

5. The brush assembly of claim 1 wherein the working end of each brush head is movable and selectively fixable in relation to a respective sheath.

6. The brush assembly of claim 1 having two or more brush heads.

7. The brush assembly of claim 1 wherein the adjustment mechanism is configured to urge the working end of each brush head away from the sheath.

8. The brush assembly of claim 1 wherein the position of each rod with respect to the sheath is adjustable.

9. A brush assembly for cleaning metal comprising:
one or more brush heads, each brush head comprising a bundle of conductive filaments, having a working end adapted for contacting metal, and a terminal end;
said brush head connectable to an electricity supply; and
a housing connected to and retaining at least one sheath, each sheath at least partially surrounding at least one brush head and wherein at least a portion of each sheath is formed from a flexible material and is configurable to form a plurality of different shapes;
wherein each brush head and its respective sheath are movable in relation to each other by operating an adjustment mechanism;
the working end of said brush head and said sheath being selectively fixable in relation to each other;
wherein the sheath is associated with a plurality of rods extending substantially parallel to a longitudinal axis of the sheath, the flexible portion extending between each rod; and
wherein the position of each rod with respect to the sheath is adjustable.

10. A brush assembly for cleaning metal comprising:
one or more brush heads, each brush head comprising a bundle of conductive filaments, having a working end adapted for contacting metal, and a terminal end;
said brush head connectable to an electricity supply; and
a housing connected to and retaining at least one sheath, each sheath at least partially surrounding at least one brush head;
an adjustment mechanism including an adjustment actuator, actuatable to cause relative movement between the one or more brush heads and the one or more sheaths;
the working end of said brush head and said sheath are selectively fixable in relation to each other, and
the adjustment mechanism including a locking mechanism configured to inhibit movement of the working end of at least one brush head in relation to its respective sheath, the adjustment actuator being operatively connected to the locking mechanism so that it is configured to release the locking mechanism and move the one or more brush heads relative to the one or more sheaths.

11. A method of cleaning metal which comprises applying the working end of at least one brush head of the brush assembly of claim 10 to the metal, while the terminal end of said brush head is connected to an electricity supply.

* * * * *